(12) United States Patent
Okumura et al.

(10) Patent No.: US 6,507,270 B2
(45) Date of Patent: Jan. 14, 2003

(54) LINEAR OPERATION TYPE ELECTRIC PART

(75) Inventors: Hirofumi Okumura, Miyagi-ken (JP); Kyuichiro Terui, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/910,616

(22) Filed: Jul. 20, 2001

(65) Prior Publication Data

US 2002/0014948 A1 Feb. 7, 2002

(30) Foreign Application Priority Data

Aug. 2, 2000 (JP) .................................... 2000-238873
May 28, 2001 (JP) .................................... 2001-159426

(51) Int. Cl.$^7$ ............................................. H01L 10/38
(52) U.S. Cl. ........................................ 338/176; 338/194
(58) Field of Search ................................. 358/176, 194

(56) References Cited

U.S. PATENT DOCUMENTS

| | | | | |
|---|---|---|---|---|
| 4,045,765 A | * | 8/1977 | Imamura | ................. 338/176 |
| 4,213,112 A | | 7/1980 | Alman et al. | |
| 4,894,638 A | | 1/1990 | Flierl et al. | |
| 5,004,996 A | * | 4/1991 | Shibazaki et al. | ........... 338/36 |
| 5,345,215 A | | 9/1994 | Okumura et al. | |
| 6,034,590 A | * | 3/2000 | Ishihara | ................. 338/183 |
| 6,204,749 B1 | * | 3/2001 | Ishihara | ................. 338/176 |

FOREIGN PATENT DOCUMENTS

| | | |
|---|---|---|
| JP | 5-7525 | 2/1993 |
| JP | 2797876 | 7/1998 |

* cited by examiner

*Primary Examiner*—Karl D. Easthom
(74) *Attorney, Agent, or Firm*—Beyer Weaver & Thomas, LLP

(57) ABSTRACT

The present invention provides a linear operation type electric part in which a spring member for restoring the movement of a movable member and a spring member for preventing the backlash of the movable member are formed of the same kind of coil spring, thereby reducing the number of part used therefore, and enabling lower cost and increased productivity, and in which a movable member can be moved smoothly. The linear operation type electric part of the present invention includes the spring assembly, composed of the spring member for restoring the movable member from its movement and the spring member for preventing the movable member from backlash, both formed of the same type of coil springs. Therefore, it is possible to provide a linear operation type electric part which, when compared to conventional counterparts, requires fewer parts, thus providing lower cost and increased productivity. Moreover, in the present invention, the spring member does not slide along the case as in conventional counterparts. Therefore, it is possible to obtain a smooth movement of the movable member.

9 Claims, 9 Drawing Sheets

LINEAR OPERATION TYPE ELECTRIC PART

BACKGROUND OF THE INVENTION

1. Field of the Invention

The present invention relates to a linear operation type electric part which is provided in an automobile having an engine mounted therein, and which may be preferably used for a sensor for controlling a mixture ratio of fuel and air, a sensor for controlling the amount of exhaust gas to be recycled, and the like.

2. Description of the Related Art

Referring to FIGS. 11 to 13, a conventional linear operation type electric part of this kind will be described. FIG. 11 is a cross-sectional view of a conventional linear operation type electric part as viewed from the side; FIG. 12 is a cross-sectional view of the conventional linear operation type electric part as viewed from the back; and FIG. 13 is a cross-sectional view of a flat spring of the conventional linear operation type electric part. In the Figures, a box case 31 includes a housing 31a with an opened back portion, a hole 31b provided in the front portion that is in communication with the housing 31a, and a pair of guide grooves 31c provided in the front-to-back direction within the housing 31a.

Moreover, an insulation substrate 33 having a resistive element 32 provided thereon is attached to the bottom of the housing 31a. The inside of the housing 31a is hermetically sealed by a sealing part 34, which closes the opened back portion of the housing 31a.

A movable member 35 having a pair of shoulder parts 35a is accommodated to be linearly movable along the front-to-back direction in the housing 31a, with the pair of shoulder parts 35a being placed within a corresponding pair of housing guide grooves 31c. On the lower part of the movable member 35 is attached, at least one sliding member 36 which slides against and is in electrical contact with the resistive element 32. Moreover, a flat spring 37 as shown in FIG. 13 is provided on an upper part of the movable member 35. The flat spring 37 presses down the movable member 35 so that the lower part of the movable member 35 elastically abuts with the case 31 to prevent backlash along the vertical direction A. At the same time, the flat spring 37 prevents backlash along the horizontal width direction B.

A coil spring 38, for biasing movable member 35 toward the front of the housing 31a and for restoring movable member 35 from backward movement, is placed between the movable member 35 and the sealing part 34. An operation shaft 39 is inserted into the hole 31b such that backward linear movement of the operation shaft 39 along the horizontal front-to-back axial direction of housing 31a causes the movable member 35 to also move linearly backward along the axial direction.

Specifically, the spring force of the coil spring 38 acts in the same direction as the axial direction of the operation shaft 39 whereas the spring force of the flat spring 37 acts in directions perpendicular to the axial direction.

Furthermore, the conventional linear operation type electric part operates as follows. First, as the operation shaft 39 is pressed backward along the axial direction, the movable member 35 moves toward the back against the action of coil spring 38.

Thus, the sliding member 36 moves on the resistive element 32 together with the movable member 35 to produce a varying resistance value, and thus enabling detection of the position of sliding member 36.

Moreover, during the movement of the movable member 35, the flat spring 37 moves together with the movable member 35 while sliding along the case 31. At the same time, the lower part of the movable member 35 moves while in slidable contact with the case 31.

When the pressure on the operation shaft 39 is released, the movable member 35 on which the sliding member 36 is attached and the operation shaft 39 are pushed frontward by the biasing force of coil spring 38 so as to restore them to their original state.

The conventional linear operation type electric part requires the flat spring 37 to prevent backlash of the movable member 35 along the vertical and horizontal directions in addition to the coil spring 38 for restoring the movable member 35 from its backward movement. In other words, there is a need for two kinds of spring parts, i.e., the coil spring 38 and the flat spring 37. The increased number of parts leads to an increased cost.

Moreover, placing the flat spring 37 inside the guide grooves 31c requires cumbersome attachment work, and thus detracts from fabrication productivity. In addition, the flat spring 37 and the case 31 are in slidable contact with each other, so that the movable member 35 cannot move smoothly.

SUMMARY OF THE INVENTION

In view of above, it is an object of the present invention to provide a linear operation type electric part in which a spring member for restoring the movement of a movable member and a spring member for preventing the backlash of the movable member are formed of the same kind of coil spring, thereby reducing the number of parts used therefore, and enabling lower cost and increased productivity, and in which the movable member can be moved smoothly.

As first means to solve the above-described problems, the structure according to the present invention comprises: an operation shaft linearly movable along an axial direction; a movable member abutting with one end of the operation shaft, the movable member being disposed so as to be linearly movable by the operation shaft; a spring member for biasing the movable member so as to be restored from movement thereof; a case having a guide part for guiding the movable member during the movement thereof; and a detection means disposed on the movable member and operated by the movement of the movable member. The guide part of the case comprises an upper guide sub-part and a lower guide sub-part for guiding surfaces of the movable member from above and below, respectively. The movable member comprises: a lower slide-contact part having the detection means on a lower side thereof and sliding in contact with the lower guide sub-part; and an upper slide-contact part located above and opposing to the lower slide-contact part, the upper slide-contact part sliding in contact with the upper guide sub-part. The upper and lower guide sub-parts and the upper and lower slide-contact parts form a restriction mechanism for restricting the movement of the movable member. The movable member receives from the spring members a turning moment for skewing a center line of the movable member in direction different to the axial direction, the center line extending along a front-to-back direction from a center of the movable member, thus rotating the movable member with respect to the axial direction, the rotation causing the upper and lower slide-contact parts of the movable member to press against and be in contact with their corresponding upper and lower guide sub-parts of the case, respectively. The restriction mechanism restricts the movement of the movable member along the vertical and width directions to prevent a backlash of the movable member. The movable member linearly moves while being skewed with respect to the axial direction.

As second means to solve the problems, the restriction mechanism has inclined planar surfaces on each of the upper and lower guide sub-parts or on each of the upper and lower slide-contact parts.

As third means to solve the problems, the restriction mechanism has inclined planar surfaces on each of the upper guide sub-parts and the upper slide-contact parts or on each of the lower guide parts and the lower slide-contact parts.

As fourth means to solve the problems, the restriction mechanism has s the surfaces of one of either a pair of the upper guide sub-parts and the upper slide-contact parts or a pair of the lower guide sub-parts and the lower slide-contact parts formed of inclined planar surfaces capable of abutting with each other, respectively, while the other pair comprises one arc-shaped surface and one flat surface abutting with the arc-shaped surface.

As fifth means to solve the problems, the restriction mechanism comprises first and second restriction mechanisms provided on left and right sides along the width direction perpendicular to the axial direction of the operation shaft.

As sixth means to solve the problems, one of a first and second restriction mechanisms is positioned near the operation shaft while the other of the first and second restriction mechanisms is positioned farther from the operation shaft than the one of the first and second restriction mechanisms.

As seventh means to solve the problems, the turning moment of the movable member is generated by a spring member comprising one coil spring.

As eighth means to solve the problem, the turning moment of the movable member is generated by a pair spring members comprising coil springs disposed on left and right sides along the width direction of the operation shaft.

As ninth means to solve the problems, a force applied to the movable member by each of the two coil springs is controlled by differentiating the respective distances between the position at which each coil spring abuts with the movable member and the corresponding position at which each coil spring abuts with the case.

As tenth means to solve the problems, the two coil springs are disposed at positions on a line extending perpendicularly to the axial direction of the operation shaft.

As eleventh means to solve the problems, the movable member is in elastic contact with the operation shaft due to an action of the spring members.

As twelfth means to solve the problems, the restriction mechanism is formed of an inclined planar surface on at least one of the upper guide sub-parts and the upper sliding parts, a flat surfaced on one of the lower guide sub-part and the lower sliding parts, and a flat surface or at least one pair of convex portions in contact with the flat surface provided on another lower guide sub-part and the lower sliding part.

As thirteenth means to solve the problems, the restriction mechanism is formed of a inclined planar surface on at least one of the lower guide sub-parts and the lower sliding parts, a flat surface on one of the upper guide sub-parts and the upper sliding parts, and a flat surface or at least one pair of convex portions in contact with the flat surface provided on another upper guide sub-part and the upper sliding part.

As fourteenth means to solve the problems, the restriction mechanism comprises opposing inclined planar surfaces provided on the upper guide sub-parts and on the upper slide-contact parts, and opposing inclined planar surfaces on the lower guide sub-parts and the lower slide-contact parts, so that each pair of corresponding inclined planar surfaces is kept in elastic contact by the turning moment applied by the spring member.

As fifteenth means to solve the problems, the spring assembly comprises a first and a second spring member for biasing the operation shaft so as to be restored from the backward movement thereof, wherein the second spring member is formed of one coil spring for pushing the movable member in a restoring direction at a position offset from the central axis.

As sixteenth means to solve the problems, prolonged arm parts, each extending toward outer ends along the width direction of the movable member and perpendicular to the axial direction, are provided on the operation shaft at an end contacting the movable member, each prolonged arm part being in contact with one of the first spring members, such that a pair of the first springs are provided at the outer ends along the width direction of the movable member so as to impart opposing turning moments on the operation shaft.

DETAILED DESCRIPTION OF THE PREFERRED EMBODIMENTS

Figure 1:
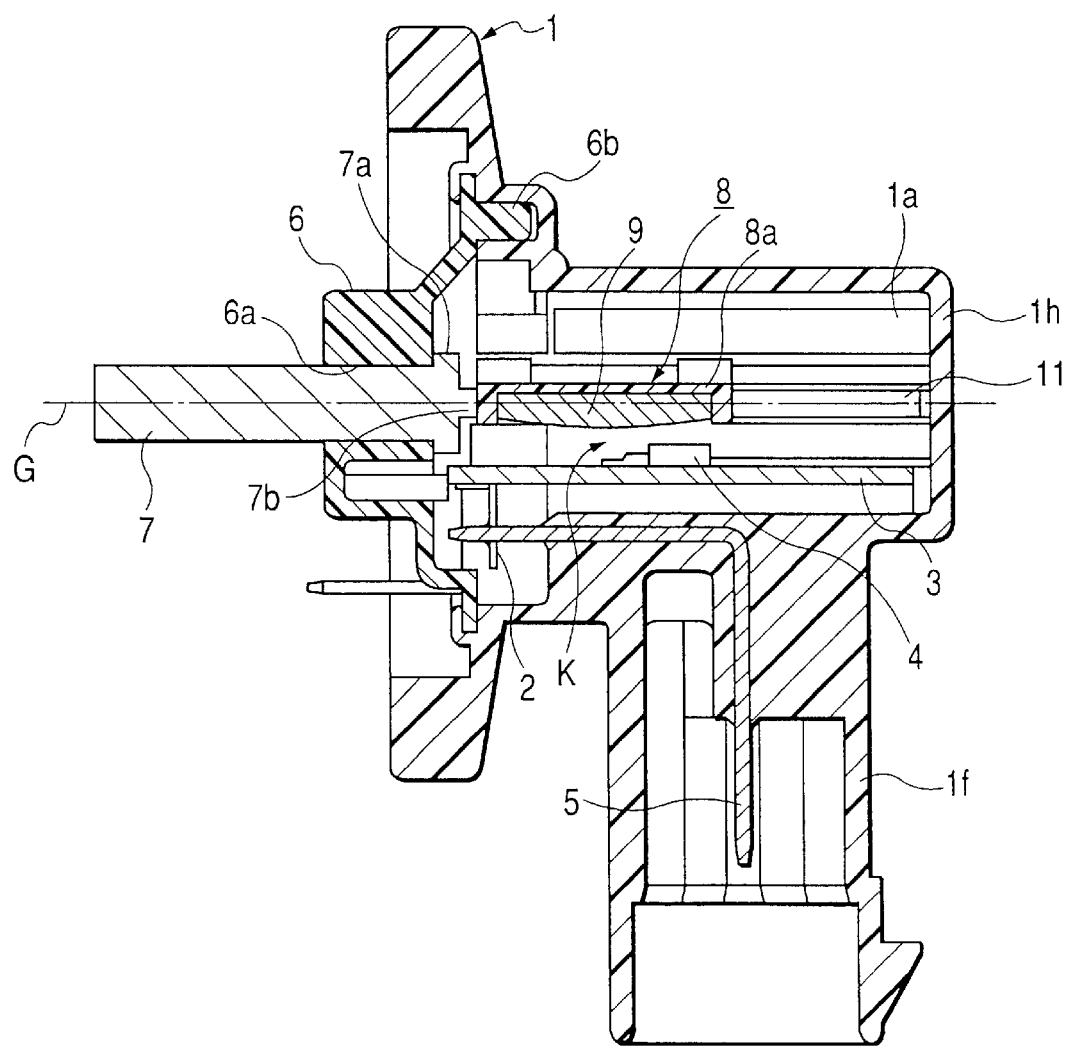
FIG. 1 is a cross-sectional view of a linear operation type electric part according to one embodiment of the present invention viewed from the side.
Figure 2:
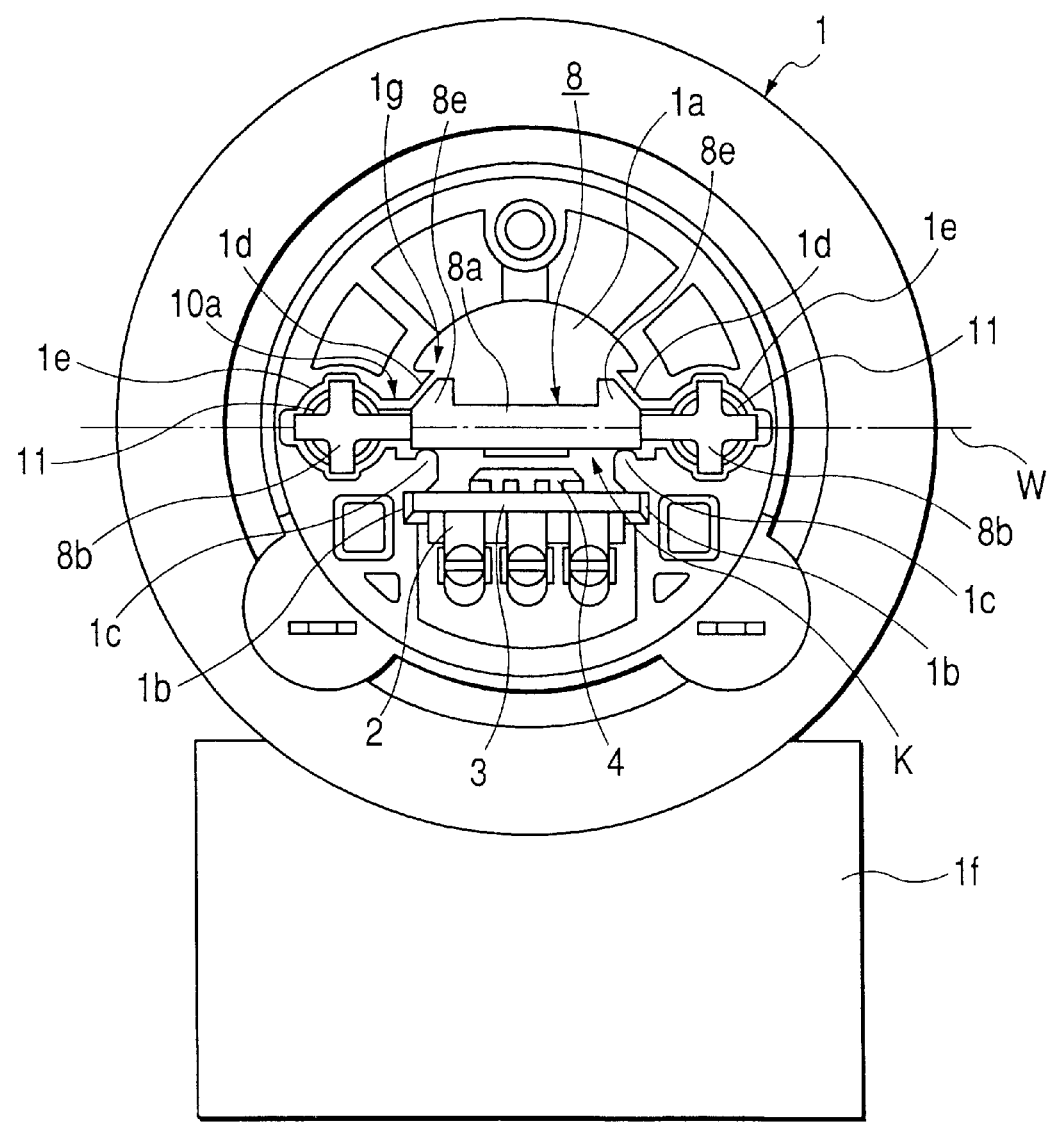
FIG. 2 is a front view of a linear operation type electric part according to one embodiment of the present invention excluding a sealing member and an operation shaft.
Figure 3:
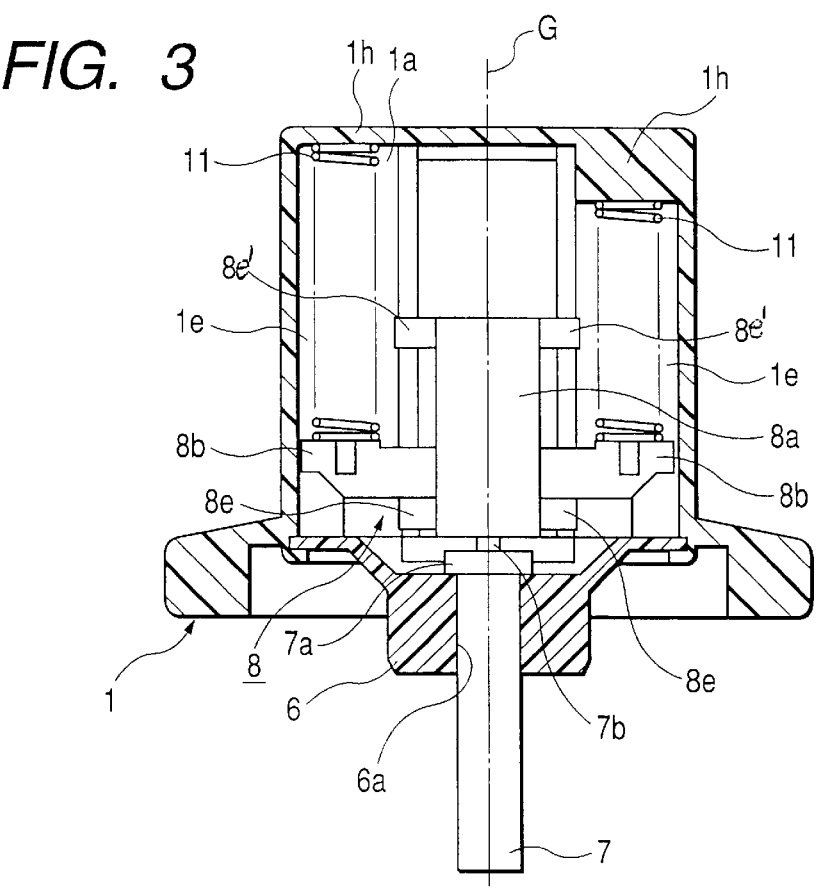
FIG. 3 is a cross-sectional view of a main part of a linear operation type electric part according to one embodiment of the present invention as viewed from above.
Figure 4:
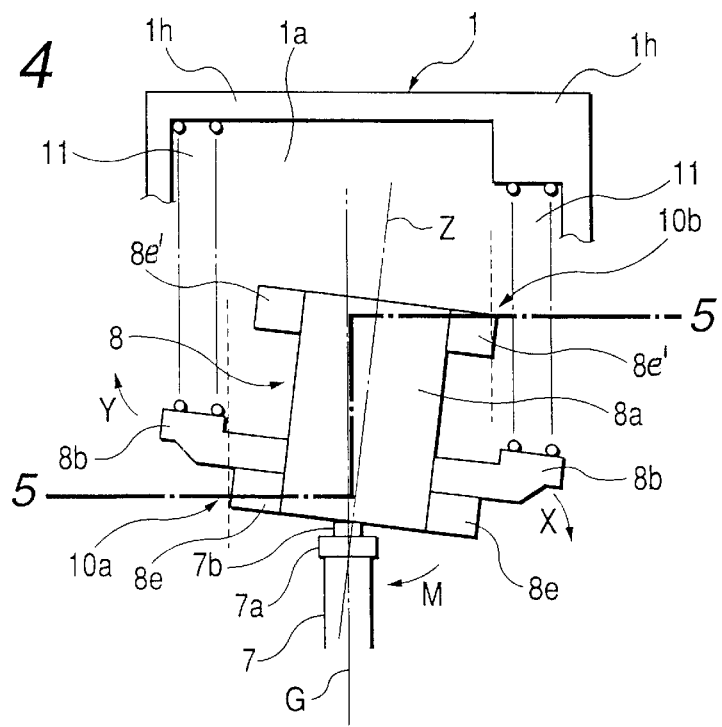
FIG. 4 is an illustrative diagram showing a motion of a movable member of a linear operation type electric part according to one embodiment of the present invention.

With reference to the accompanying drawings, preferred embodiments of the linear operation type electric part according to the present invention will be described. FIG. 1 is a cross-sectional view of one embodiment of the linear operation type electric part according to the present invention as viewed from the side; FIG. 2 is a front view thereof excluding a sealing member and an operation shaft; FIG. 3 is a cross-sectional view of a main part thereof as viewed from above; FIG. 4 is an illustrative diagram showing a motion of a movable member of one embodiment of the linear operation type electric part according to the present invention; and FIG. 5 is a cross-sectional view of a main part sectioned along line 5—5 in FIG. 4 (Note that section line 5—5 offsets).

Referring to FIGS. 1 to 5, one embodiment of the linear operation type electric part according to the present invention will be described. A molded case 1 formed of a synthetic resin includes: a hollow housing 1a having an opening at one end thereof; a pair of concave shoulder parts 1b extending within the housing 1a along a front-to-back direction and with one member of the pair being on each of the left and right sides of the housing 1a; a pair of lower guide sub-parts 1c which present arc-shaped convex faces projecting upwardly into the hollow of housing 1a and extending along a front-to-back direction on the left and right from the axial direction G side of the housing 1a; a left and right pair of upper guide sub-parts 1d which have inclined planar surface within the housing 1a and which extend along the front-to-back direction and which are located above and opposed to the corresponding left and right members of the pair of lower guide sub-parts 1c; a pair of cylindrical holding sections 1e of different lengths, within the housing 1a and extending along the front-to-back direction on the left and right sides of housing 1a; and a tube-like part 1f projecting perpendicularly from the housing 1a.

Figure 5:
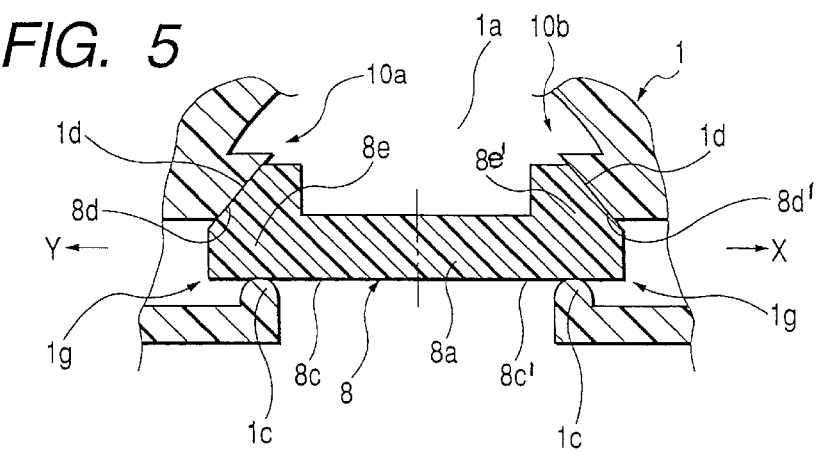
FIG. 5 is a cross-sectional view of main parts sectioned along line 5—5 in FIG. 4.

The pairs of lower guide sub-parts 1c and the upper guide sub-parts 1d together form a guide part 1g for a movable member 8, described later, and the guide part 1g is formed in such a manner that the vertical distances between the lower guide subparts 1c and their corresponding upper guide subparts 1d becomes smaller away from the central portion of the movable member 8 toward the outside along the width direction, i.e., the inclined planar surfaces of the left and right upper guide sub-parts 1d both slant downwardly and outwardly when viewed in front cross section as shown in FIG. 5.

Moreover, as shown in FIG. 3, the left and right members of the pair of holding sections 1e have different lengths due to different thicknesses of a back wall 1h of the case 1 defining the holding sections 1e.

On an insulation substrate 3 having a plurality of metal terminals 2 attached thereon, a Hall effect integrated circuit (Hall IC) 4 is attached to be electrically connected to the terminals 2. The insulation substrate 3 is inserted between the left and right members of the pair of the shoulder parts 1b of the case 1 within the housing 1a as shown on FIG. 2.

Each terminal 2 attached to the insulation substrate 3 is connected by soldering to one end of an L-shaped connector pin 5 embedded in the case 1.

A sealing member 6 made of a synthetic resin or the like includes an aperture 6a provided in its center and a projecting strip portion 6b provided in a back portion of its outer periphery. The sealing member 6 is placed to cover the opening of the case 1 by crimping a part of the case 1 so that the projecting strip portion 6b is received by the case 1. Thereby, the housing 1a is hermetically sealed by the sealing member 6.

An operation shaft 7 includes a guard portion 7a provided at its back, and a convex portion 7b provided at the back end of guard portion 7a projecting along the front-to-back axial direction G. The operation shaft 7 is inserted through the aperture 6a of the sealing member 6 from the back to the front of aperture 6a so that the guard portion 7a is latched by the sealing member 6. Thus, the operation shaft 7 is mounted to the sealing member 6 so as to be linearly movable along the axial direction G of housing 1a.

As shown in the offset front-view sectional drawing of FIG. 5, the movable member 8, which is made of a molded synthetic resin, includes: a rectangular base 8a positioned in the center of the housing 1a extending along the front-to-back direction of the axial direction G of housing 1a) and along the width direction that is perpendicular to the axial direction G; a pair of spring receiving parts 8b extending from the base 8a along the width direction having a cross-shaped end; a pair of front sliding parts 8e located at the left and right sides along the width direction of a front end of the base 8a, each comprising a front lower sliding part 8c having a flat surface (provided on the lower side of front sliding parts 8e) and a front upper sliding part 8d having a inclined planar surface (provided on the upper side of front sliding parts 8e); and a pair of back sliding parts 8e' located at the left and right sides along the width direction of a back end of the base 8a, each comprising a back lower sliding part 8c' having a flat surface (provided on the lower side of back sliding parts 8e') and an back upper sliding part 8d' having a inclined planar surface (provided on the upper side of back sliding parts 8e').

The distances along the vertical direction between the pairs of front and back sliding parts 8e and 8e', each comprising the lower sliding parts 8c and 8c' and their corresponding upper sliding parts 8d and 8d', respectively, become smaller away from the central portion toward the outer ends of the width direction, i.e., the inclined planar surfaces of the upper sliding-parts 8d and 8d' slant downwardly and outwardly.

Moreover, on a lower part of the movable member 8, a magnet 9, which is magnetized to have its north and south poles aligned along the axial direction G, is attached. The movable member 8, having the magnet 9 attached thereto, has a structure in which the front and back pairs of lower and upper sliding parts 8c and 8d and 8c' and 8d' of the pairs of front and back sliding parts 8e and 8e', respectively, are inserted in the guide part 1g, which comprises the left and right pairs of lower and upper guide sub-parts 1c and 1d, with the magnet 9 facing the Hall IC 4. In the vicinity of the pair of front sliding parts 8e, the pairs of lower and the upper slide-contact parts 8c and 8d and the corresponding pair of lower and upper guide sub-parts 1c and 1d comprise first restriction mechanisms 10a. In the vicinity of the pair of back sliding parts 8e', the pairs of lower and the upper slide-contact parts 8c' and 8d' and the corresponding pair of lower and the upper guide sub-parts 1c and 1d comprise second restriction mechanisms 10b.

On the lower side of the movable member 8 having the magnet 9 attached thereto, the pairs of lower slide-contact parts 8c and 8c' abut with the corresponding pair of lower guide sub-parts 1c whereby downward movement of movable slide member 8 and attached magnet 9 is restricted. Likewise, on the upper side of the movable member 8, the pairs of upper slide-contact parts 8d and 8d' abut with the corresponding pair of upper guide sub-parts 1d whereby upward movement of movable slide member 8 and attached magnet 9 is restricted.

When the movable member 8 is attached, the first restriction mechanisms 10a are positioned closer to the operation shaft 7 whereas the second restriction mechanisms 10b are positioned farther from the operation shaft 7 than the first restriction mechanisms 10a. The magnet 9 and the Hall IC 4 compose a detecting means K.

One of two identical coil spring members 11 is positioned within each of the holding sections 1e in the housing 1a so that one end of each spring abuts with the back wall 1h while the other end of each spring abuts with the corresponding member of the pair of spring receiving parts 8b of the movable member 8.

Thus, the two spring members 11 are positioned on right and left sides of the operation shaft 7 along the width direction perpendicular to the axial direction G.

The two springs members 11 bias the movable member 8 forward so that the front center of the movable member 8 is in elastic contact with the projection 7b of the operation shaft 7. The two inserted spring members 11 are respectively accommodated within the two holding sections 1e each having a different distance between the back wall 1h and the corresponding spring receiving part 8b, so that the two spring members 11, being differently compressed, bias the movable member 8 with different forces. Consequently, as shown in FIG. 4, a turning moment M (rotary force) is generated in the movable member 8 so that the center line Z of moveable member 8 extending along its front-to-back direction becomes skewed with respect to the axial direction G of housing 1a. Therefore, the movable member 8 rotates around the convex portion 7b of operation shaft 7 within a plane extending along the width direction as to its axis so that the center line Z becomes skewed with respect to the axial direction G of the housing 1a and operation shaft 7.

Moreover, when the turning moment M is generated in the movable member 8, the left front sliding part 8e is pushed into the space between the left lower guide sub-part 1c and the left upper guide subpart 1d by rotating in a direction shown by an arrow Y in FIG. 5. As a result, the left front lower slide-contact part 8c, defined by a flat surface of the movable member 8, is pressed until it abuts with the left lower guide sub-part 1c having an arc face, while the inclined planar surface of the left upper guide sub-part 1d and the inclined planar surface of the left front upper slide-contact part 8d abut with each other.

Accordingly, the movable member 8 is prevented from having a downward backlash by the lower guide sub-part 1c, and the movable member 8 is prevented from having an upward backlash by the upper guide sub-part 1d. Furthermore, the movable member 8 is interposed between the lower guide sub-part 1c and the upper guide sub-part 1d so that backlash along the left-to-right direction (i.e., the width direction) is also prevented.

As described above, the first restriction mechanisms 10a comprise the front pair of lower and upper slide-contact parts 8c and 8d, and the lower and upper guide sub-parts 1c and 1d.

Moreover, when the turning moment M is generated in the movable member 8, the right back sliding part 8e' is pressed into a space between the right lower guide sub-part 1c and the right upper guide subpart 1d by rotating in a direction shown by an arrow X as shown in FIG. 5. As a result, the right back lower slide-contact part 8c' defined by the flat surface of the movable member 8 is pressed until it abuts with the right lower guide sub-part 1c having an arc face, with the inclined planar surface of the right upper guide sub-part 1d and the inclined planar surface of the right back upper slide-contact part 8d' abutting with each other.

Accordingly, movable member 8 is prevented from having a downward backlash by the lower guide sub-part 1c, and the movable member 8 is prevented from having an upward backlash by the upper guide sub-part 1d. Furthermore, the movable member 8 is interposed between the lower guide sub-part 1c and the upper guide sub-part 1d so that backlash along the left-to-right direction (i.e., the width direction) is also prevented.

As described above, the second restriction mechanisms 10b comprise the back pair of lower and upper slide-contact parts 8c' and 8d', and the lower and upper guide sub-parts 1c and 1d.

The first and second restriction mechanisms 10a and 10b, respectively, are provided in the left and right positions along the width direction interposing the axial direction G of the operation shaft 7. Two coil springs (spring members) 11, are disposed along one line W (refer to FIG. 2) perpendicular to the axial direction G of the operation shaft 7.

By disposing both spring members 11 along the line W, a good pressure balance is maintained when pressing the operation shaft 7.

As described above, when the turning moment M is generated in the movable member 8, the lower parts of the front sliding part 8e and the back sliding parts 8e' of the movable member 8 slide under elastic pressure while restricted by the flat surface of the lower guide sub-part 1c. Accordingly, the downward movement of the movable member 8 is restricted by the lower guide sub-part 1c. The upper parts of the front sliding part 8e and the back sliding parts 8e' of the movable member 8 slide under elastic pressure while restricted by the inclined planar surface of the upper guide sub-part 1d. Accordingly, the upward movement of the movable member 8 is restricted by the upper guide sub-part 1d. Therefore, the movable member 8 slides without experiencing a backlash along the vertical direction, so that the vertical distance between the Hall IC 4 and the magnet 9 is maintained at a fixed value.

If the vertical distance between the Hall IC 4 and the magnet 9 changed, the output value of the Hall IC 4 would change relative to a reference value. However, since the present invention ensures that a fixed vertical distance is maintained between the Hall IC 4 and the magnet 9, the movable member 8 can be held stably, and therefore, the output value does not vary even if vibration or the like occurs. Thus, it is possible to obtain an output value exhibiting excellent linearity as the magnet 9 moves.

Specifically, as shown in FIG. 5, in an offset cross section taken perpendicularly to the axial direction G, the lower part of the movable member 8, and the lower slide-contact parts 8c and 8c' and the upper slide-contact parts 8d and 8d', abut with the lower part of the case 1 at lower guide subparts 1C, and with the upper guide sub-parts 1d in the upper and lower positions, respectively, so that a backlash along the vertical direction is particularly prevented.

Furthermore, it is possible to move the movable member 8 while preventing a backlash along the horizontal direction (width direction). In addition, the rotary force applied to the movable member 8, which takes a value obtained by multiplying the spring constant by a difference between the total spring deflection of each spring, can be kept constant at any sliding position of the movable member 8. Since the difference between the spring deflections is constant, the rotary force is constant and thus, a smooth movement can be realized.

Now, an operation of the linear operation type electric part of the present invention will be described. For example, when a pedal of an automobile is depressed, the operation shaft 7 moves against the force of the spring members 11 by way of an intervening member.

Along with the operation shaft 7, the movable member 8 moves linearly along the axial direction G while being guided by the first and second restriction mechanisms 10a and 10b.

The magnet 9 also moves and varies the magnetic field to the Hall IC 4. As a result, changing voltage values are detective by the detection means K, thus enabling position detection.

Moreover, when the pressure on the pedal is released, the movable member 8 is pushed back by the spring members 11, and the operation shaft 7 is also pushed back to the original state by the movable member 8.

Thus, the linear operation type electric part of the present invention may occur.

In the above-described embodiment, the detection means K has a structure that includes the magnet 9 and the Hall IC 4. Alternatively, the detection means K may have a structure including a potentiometer or the like including a resistive element and a slider.

Moreover, in the above-described embodiment, the first and second restriction mechanisms 10a and 10b are provided on the upper side of the removable member 8 with the upper guide sub-part 1d presenting a inclined planar surface and the upper slide-contact parts 8d and 8d' presenting an inclined planar surface. Alternatively, they may have a structure comprising the lower guide sub-part 1c and the lower slide-contact part 8c and 8c' each having an inclined planar surface on the lower side of the movable member 8.

Furthermore, in the above-described embodiment, the upper guide sub-part 1d and the upper slide-contact part 8d and 8d' each presenting an inclined planar surface are provided for both the case 1 and the movable member 8. Alternatively, the inclined planar surface may be provided to either the case 1 or the movable member 8.

In the above-described embodiment, the spring members 11 comprise a pair of coil springs with equal spring constants. By differentiating the distance between the case 1 and the movable member 8, compressing force of the coil springs varies so as to generate the turning moment in the movable member 8. Alternatively, two coil springs each having equal spring force may be placed in different positions along the width direction from the axial direction G to generate the turning moment in the movable member 8, or two coil springs each having different spring force may be used to generate the turning moment in the movable member 8.

In the above-described embodiment, the turning moment is generated in the movable member 8 by two coil springs serving as the spring members 11. Alternatively, the spring members 11 may be comprise only one coil spring or one twisted-coil spring, etc., which is placed at an offset position from the axial direction G so as to generate the turning moment in the movable member 8.

Moreover, in the above-described embodiment, the turning moment M is generated in the movable member 8 about the operation shaft 7 abutting with the movable member 8 in a front central portion thereof. However, the turning moment M may be generated in the movable member 8 by employing the operation shaft 7 to abut with the movable member 8 at a position offset from the central portion thereof.

In the above-described embodiment, the upper slide-contact parts 8d and 8d', presenting inclined planar surfaces, are provided on the upper side of the movable member 8, and the upper guide sub-parts, having opposing inclined planar surfaces, is provided so that, when the turning moment M is generated, the movable member 8 is pressed toward the lower side. Alternatively, the inclined planar surface may be provided to the lower side of the movable member 8 to apply a pressure to the upper side of the movable member 8 by the inclined planar surface.

Moreover, in the guide part 1g a groove is formed in the case 1 in which the movable member 8 is inserted so that the movable member 8 freely moves along the front-to-back direction. Alternatively, a groove may be formed in the movable member 8 and a projection to be inserted in the groove may be provided on the case 1.

Moreover, in the above-described embodiment, a pair of the lower guide sub-parts 1c are formed in an arc-shaped convex curve, and the lower side of the front sliding parts 8e and the lower side of the back slide parts 8e' are of flat surfaces. Alternatively, the shapes of the parts may be reversed, or both may be flat surfaces.

Furthermore, in the above-described embodiment, the movable member 8 moves in a direction parallel to the axial direction G of the operation shaft 7 by the lower guide sub-parts 1c. Alternatively, the lower guide sub-part 1c may be slightly bent along the axial direction G to adapt to the output characteristics of the magnet 9 and the Hall IC 4. Likewise, the Hall IC 4 and the magnet 9 are placed parallel to each other by the pair of the lower guide sub-part 1c in the above-described embodiment, but they may be placed slightly angled with each other by varying the height of the pair of the lower guide sub-parts 1c.

In the above-described embodiment, the length of each member of the pair of holding sections 1e is differentiated by varying the thickness of the back wall 1h. Alternatively, the compression degree of each of the spring members 11 may be varied by projecting one of the spring receiving part 8b toward the back.

Figure 6:
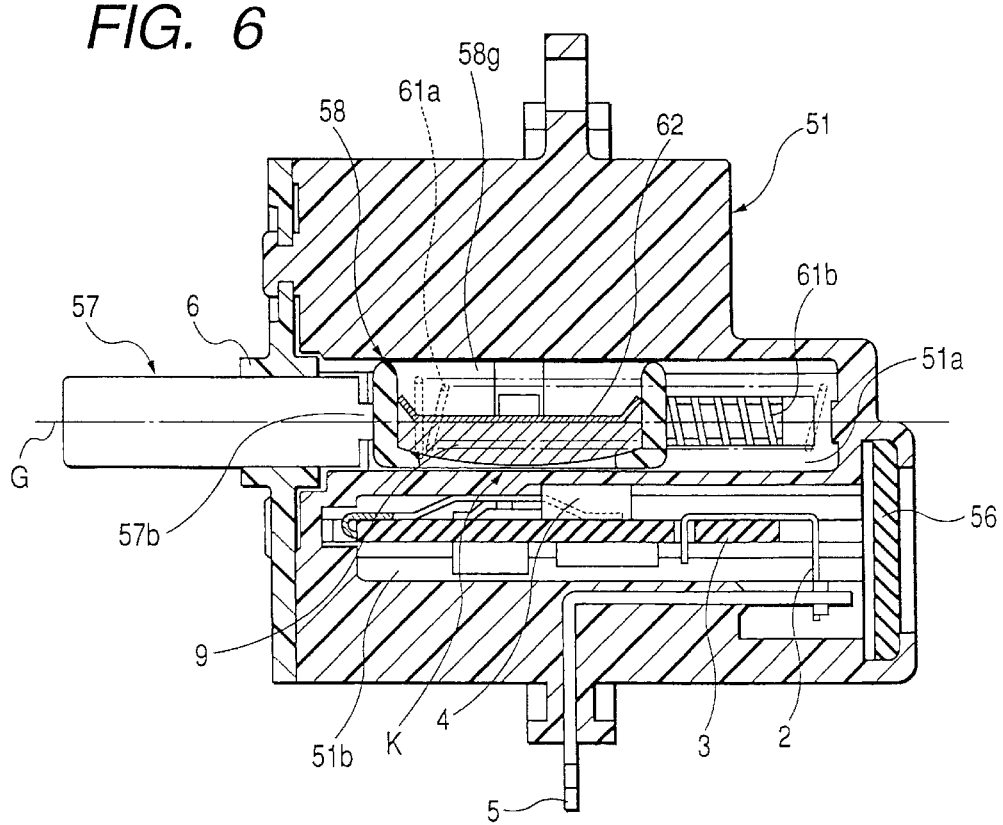
FIG. 6 is a cross-sectional view of a linear operation type electric part according to another embodiment of the present invention as viewed from the side.
Figure 7:
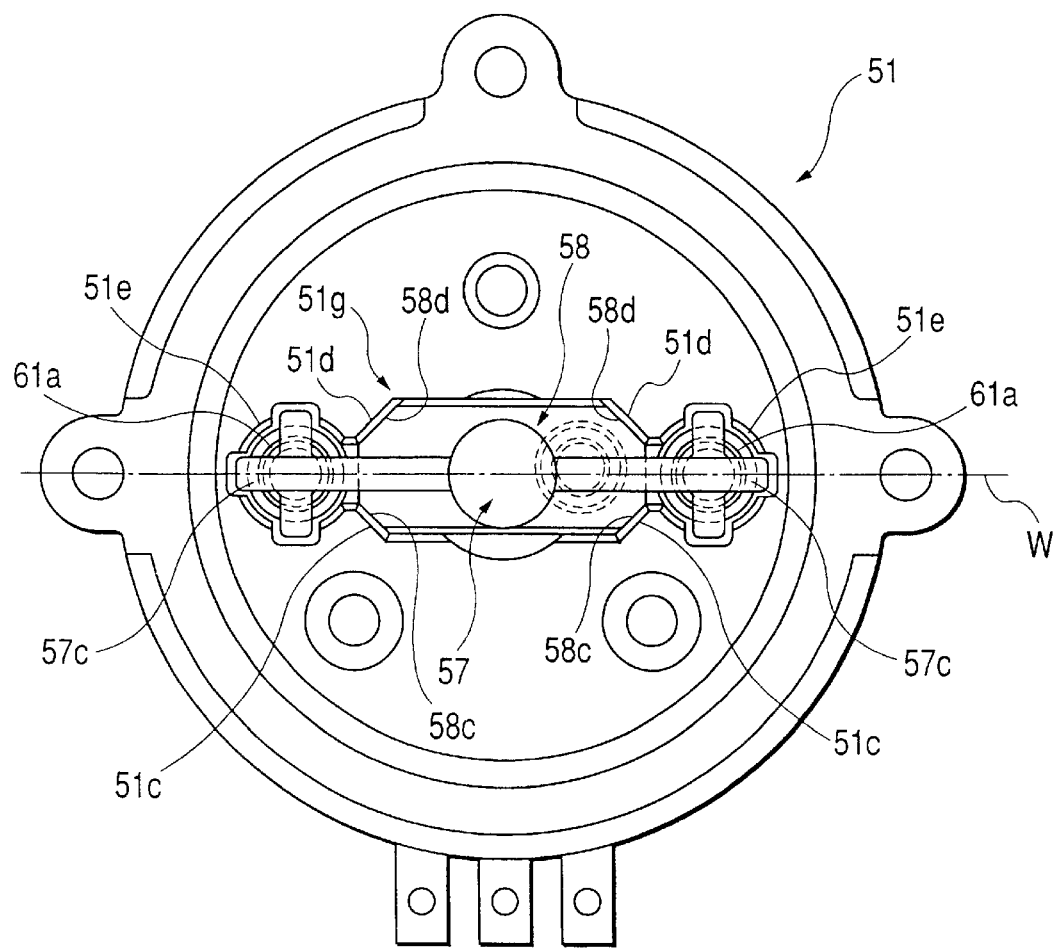
FIG. 7 is a front view of a linear operation type electric part according to another embodiment of the present invention excluding a sealing member and an operation shaft.
Figure 8:
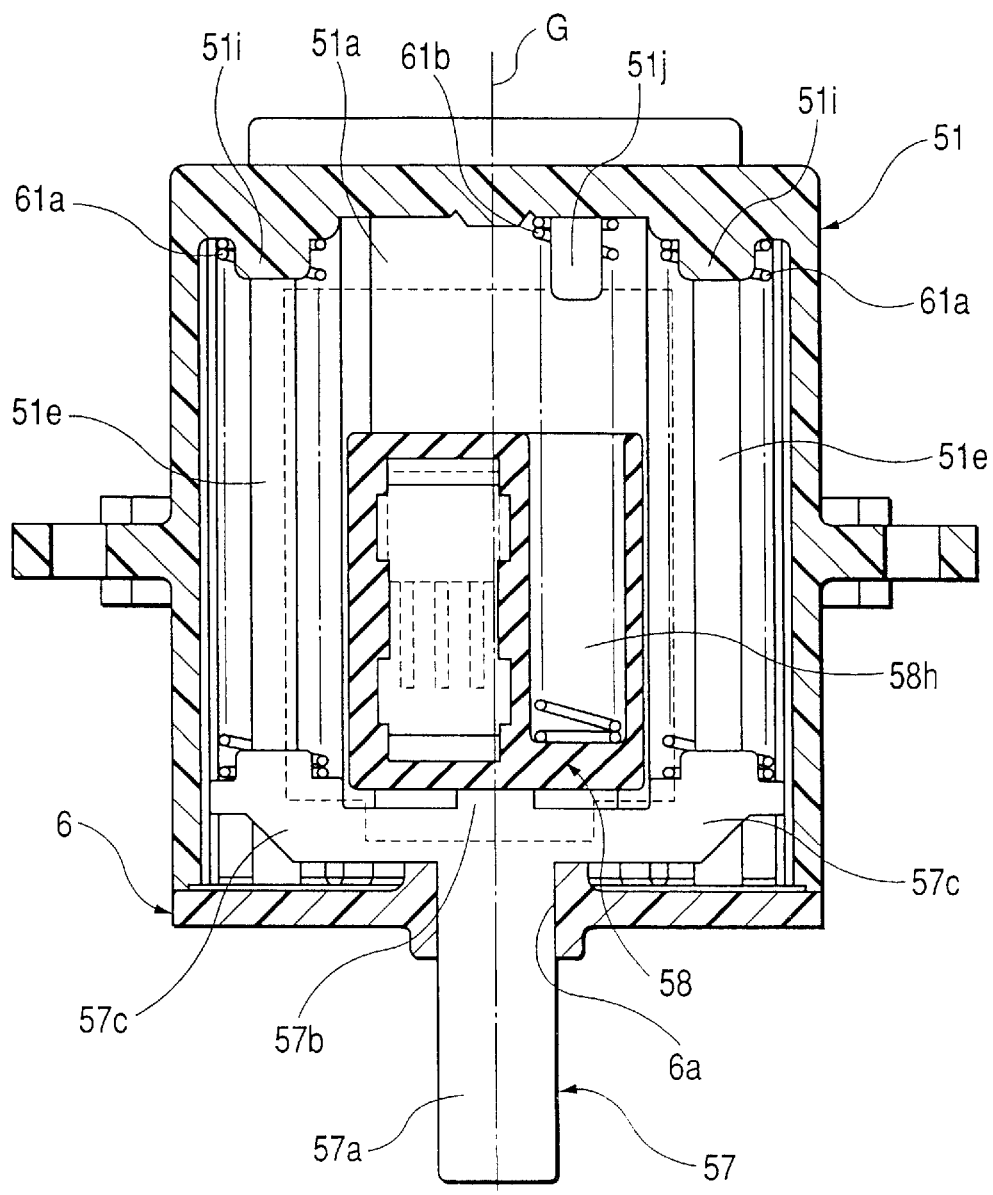
FIG. 8 is a cross-sectional view of a main part of a linear operation type electric part according to another embodiment of the present invention as viewed from above.
Figure 9:
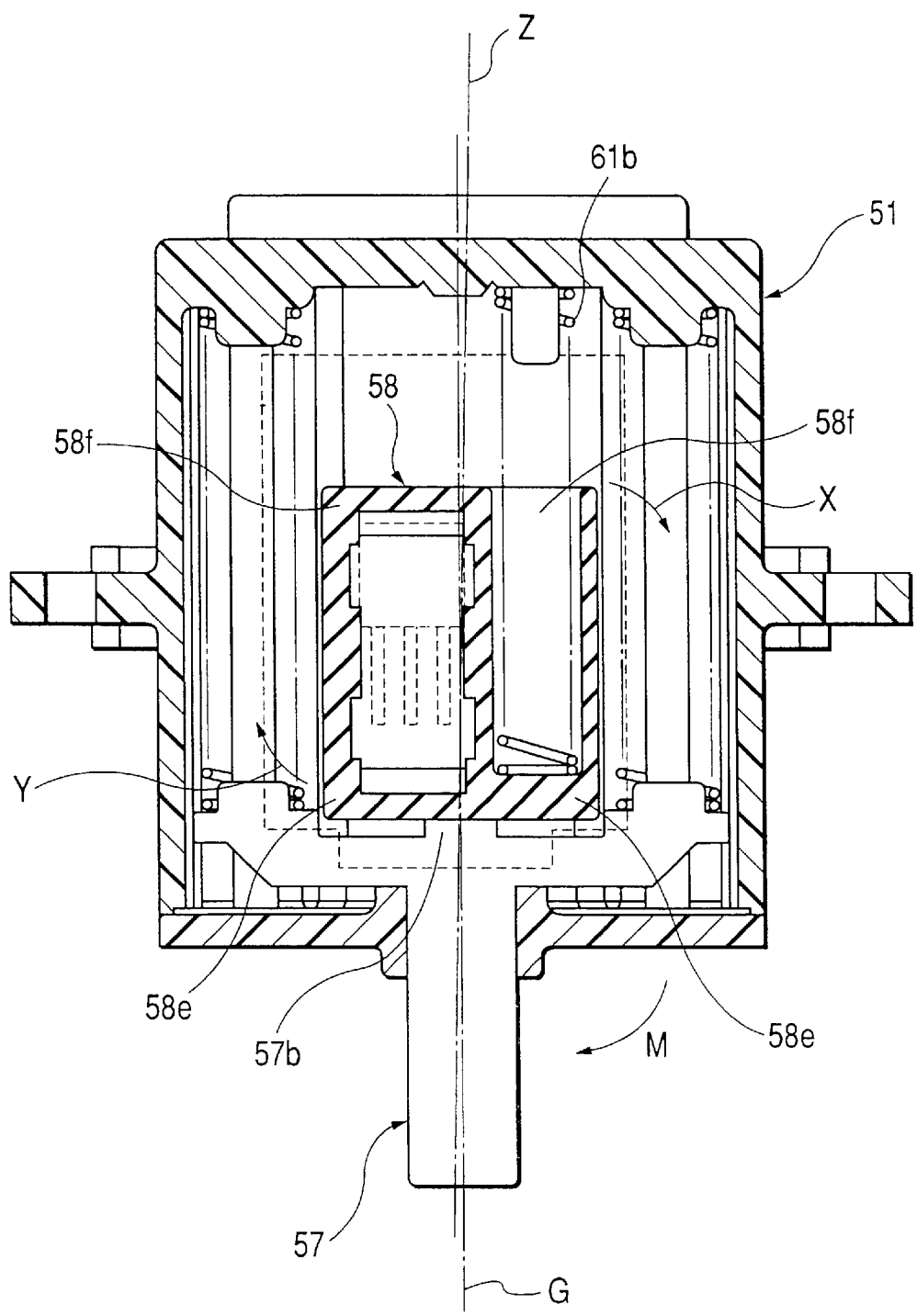
FIG. 9 is an illustrative diagram showing motion of a movable member of a linear operation type electric part according to another embodiment of the present invention.
Figure 10:
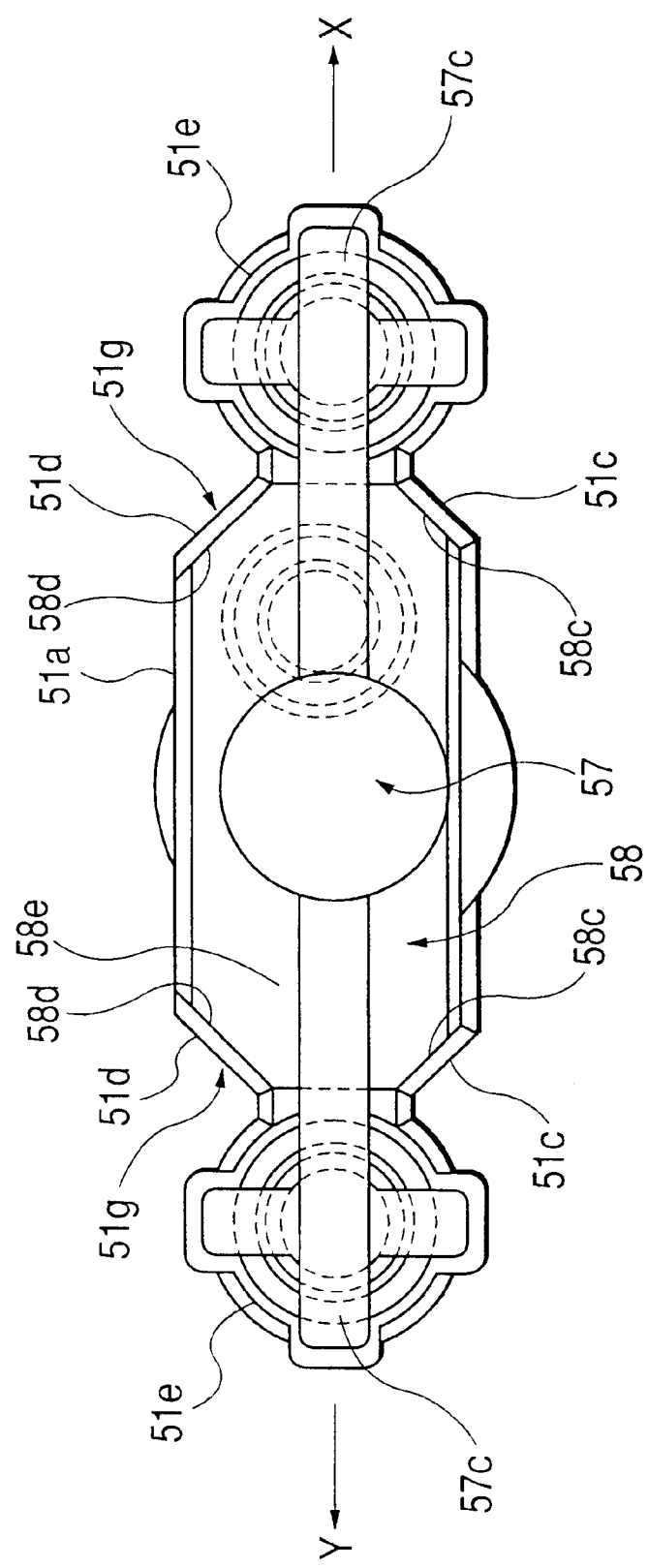
FIG. 10 is a front view of main parts illustrating upper and lower guide sub-parts and upper and lower sliding parts of a linear operation type electric part according to another embodiment of the present invention.
Figure 11:
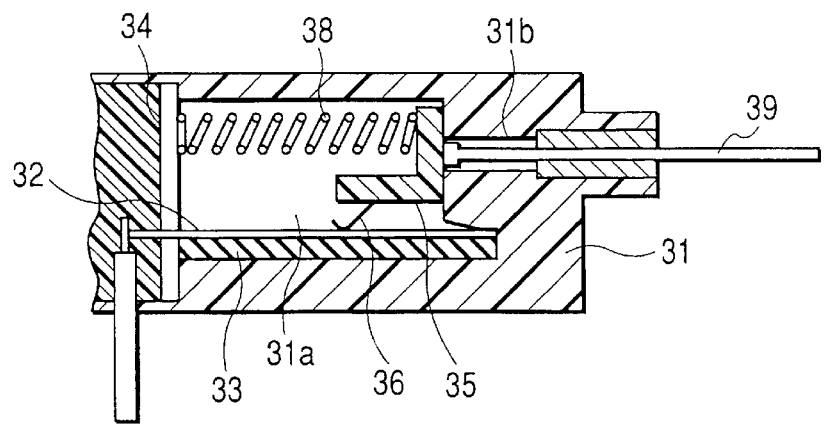
FIG. 11 is a cross-sectional view of a conventional linear operation type electric part as viewed from the side.
Figure 12:
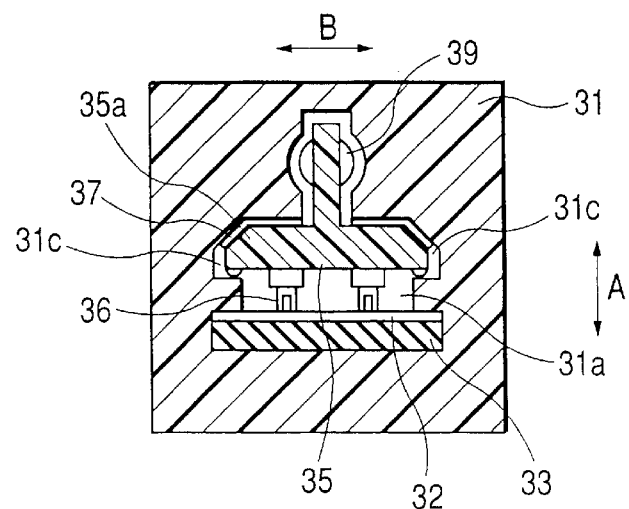
FIG. 12 is a cross-sectional view of a conventional linear operation type electric part as viewed from the back.
Figure 13:
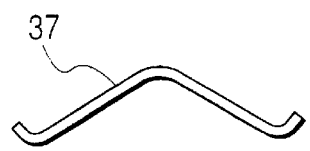
FIG. 13 is a cross-sectional view of a flat spring of a conventional linear operation type electric part.

FIGS. 6 to 10 show the structure of the linear operation type electric part of another embodiment according to the present invention. FIG. 6 is a cross-sectional view of the linear operation type electric part according to the present invention viewed from the side, FIG. 7 is a front view thereof without a sealing member, FIG. 8 is a cross-sectional view showing a main parts of the linear operation type electric part according to the present invention viewed from above, FIG. 9 is a diagram illustrating a movement of a movable member of the linear operation type electric part according to the present invention, and FIG. 10 is a front view illustrating the main parts, including the upper and lower guide sub-parts and the upper and lower sliding parts. The same parts shown in FIGS. 1 to 5 are denoted by the same reference numerals, and the description thereof is omitted.

The parts differ from the first embodiment illustrated with reference to FIGS. 1 to 5 are as follows: A part of the structure of the operation shaft and the movable member, the structure of spring members biasing the operation shaft and the movable member, and the structure of the upper and lower guide sub-parts and the upper and lower sliding parts. Specifically, in the second embodiment, an operation shaft 57 is provided having at its back end a shaft portion 57a projecting along the axial direction G. A convex portion 57b abutting with a movable member 58, described later, and a pair of prolonged arm parts 57c, each extending from proximity of the convex part 57b outward along the width direction of the movable member 58 and perpendicular to the axial direction G, are formed. Each member of a pair of first spring members 61a, described later, abuts with its corresponding prolonged arm part 57c. The first spring members 61a are provided to contact with the corresponding prolonged arm parts 57c, such that the first spring members 61a are at the outer ends along the width direction of the movable member 58 providing balanced opposing turning moments on operation shaft 57.

The movable member 58, made of molded synthetic resin, is formed in a substantially rectangular shape. On each of the left and right sides of the movable member 58 along its width direction, a pair each of upper and lower sliding parts 58d and 58c, respectively, each comprising an inclined planar surface, are formed at the four corners (front, back, left and right). Left and right pairs of front sliding parts 58e and back sliding parts 58e and 58f, respectively, are each comprised of the upper and lower slide-contact parts 58d and 58c, respectively, and are formed in such a manner that the vertical distances between the lower slide-contact parts 58c and their corresponding upper slide-contact parts 58d becomes smaller away from the central portion toward the outside along the width direction, i.e., the inclined planar surfaces of the front and back pairs upper slide-contact parts 58d slant downwardly and outwardly and the front and back pairs of lower slide-contact parts 58c slant downwardly and inwardly when viewed in front cross section as shown in FIG. 10.

In the movable member 58, a mounting hole 58g having an opened lower portion is formed to receive the magnet 9 at a position offset in one direction from the center of the axis G. The magnet 9, which is inserted in the mounting hole 58g from above, is fixed by a positioning plate 62 so that the lower side of magnet 9 faces the Hall IC 4. A spring housing hole 58h is formed in a position opposite from the mounting hole 58g and is offset in the other direction from the central axis G. By mounting a second spring member 61b, described later, in the spring housing hole 58h, the movable member 58 is pressed in a restoring direction by spring member 61b at a position offset from the central axis G.

A case 51, which is made of molded synthetic resin, includes: a first housing part 51a provided with a cavity, which opens in the front of the first housing 51a and projects backward in the direction to which the operation shaft 57 is projected; and a second housing part 51b formed to have a cavity that opens at the back of the second housing 1b and projects frontward in the opposite direction from that of the cavity provided in the first housing part 51a. The first housing part 51a includes: a guide part 51g which accommodates the movable member 58 that can be linearly moved along the axial direction G; and a left and right pair of hollow cylindrically shaped holding sections 51e which extend within the first housing part 51a along the front-to-back direction on both sides of the guide part 51g. Moreover, two spring latching parts 51i and one spring latching part 51j for latching the pair of first and the single second spring members 61a and 61b, respectively, are provided on the inner back portion of the first housing part 51a.

The guide part 51g, comprises a left and right pair of upper guide sub-parts 51d and a left and right pair of lower guide sub-parts 51c, formed adjacent the upper and lower front to back edges of the movable member 58. The pairs of upper and lower guide sub-parts 51d and 51c abut and slide against, respectively, the corresponding upper and lower slide-contact parts 58d and 58c that present opposing inclined planar surfaces. The guide part 51g is formed in such a manner that a vertical distances between the lower guide sub-parts 51c and their corresponding upper guide sub-parts 51d becomes smaller away from the central portion toward the outside along the width direction as shown in FIG. 10. Moreover, a sealing member 6 is provided to cover the opening of the first housing part 51a. The shaft portion 57a of the operation shaft 57 is inserted through an aperture 6a provided in the center of the sealing member 6. Thus, the operation shaft 57 is mounted to be linearly movable along axis G.

As shown on FIG. 6, the insulation substrate 3 is attached to the second housing 51b. On the insulation substrate 3, a plurality of metal terminals 2 and a Hall IC 4, which is electrically connected to the terminals 2, are attached. Each terminal 2 is connected by soldering to one end of an L-shaped connector pin 5 embedded in the case 51. The sealing member 56 is placed to cover the opening of the second housing part 51b. The second housing part 51b is placed by crimping a part of the case 51 against sealing member 56 to hermetically seal the second housing part 51b.

The spring assembly comprises the pair of first spring members 61a and the second spring member 61b, each comprising coil springs. The first spring members 61a, comprising two identical coil springs having the same specification, are accommodated within their corresponding holding sections 51e of the case 51. One end of each thereof is latched by the corresponding spring latching part 51i and the other end of each by the corresponding prolonged arm part 57c of the operation shaft 57, thereby biasing the operation shaft 57 forward along the axial direction G.

Moreover, the second spring member 61b, comprising one coil spring, is accommodated within the first housing part 51a of the case 51. One end thereof is latched by the spring latching part 51j and the other end by the spring housing hole 58h of the movable member 58. Accordingly, the center of the movable member 58 is in elastic contact with the convex portion 57b of the operation shaft 57. Because the movable member 58 is biased forward, backward movement of the movable member 58 along the axial direction G is resisted and movable member 58 is restored to its forward position upon release of the force causing backward movement of movable member 58.

In this case, the second spring member 61b biases the movable member 58 in the forward restoring direction at a position offset from the central axis G as shown in FIG. 9. Therefore, a turning moment M (rotary force) is generated in the movable member 58 by which the center line Z extending along the front-to-back direction (from the central portion of the movable member 58 along the width direction) becomes skewed with respect to the axial direction G. Accordingly, the movable member 58 rotates around the convex portion 57b of the operation shaft 57 within a plane extending perpendicularly to its axis of rotation while the centerline Z becomes skewed with respect to the axial direction G of the operation shaft 57. The biasing force of the second spring member 61b is set to be smaller than that of the first spring member 61a.

When the turning moment M is generated in the movable member 58, the left front sliding part 58e of the movable member 58 is pushed into the space between the left upper guide sub-part 51d and the left lower guide sub-part 51c by rotating in the direction of arrow Y as shown in FIGS. 9 and 10. Consequently, the upper guide sub-part 51d and the upper slide-contact part 58d, and the lower guide sub-part 51c and the lower slide-contact part 58c abut, respectively, with each other while pressed along corresponding inclined planar surfaces. Therefore, vertical backlash of the movable member 58 is prevented by the upper guide sub-part 51d and the lower guide sub-part 51c. In addition, the movable member 58 is interposed between the upper guide sub-part 51d and the lower guide sub-part 51c so that a horizontal (width direction) backlash is also prevented.

When the turning moment M is generated in the movable member 58, the right back sliding part 58ƒ of the movable member 58 is pushed into the space between the right upper guide sub-part 51d and the right lower guide sub-part 51c by rotating in the direction of arrow X as shown in FIGS. 9 and 10. Consequently, the upper guide sub-part 51d and the upper slide-contact part 58d, and the lower guide sub-part 51c and the lower slide-contact part 58c are, respectively, in contact with each other while pressed along corresponding inclined planar surfaces. Therefore, vertical backlash of the movable member 58 is prevented by the upper guide sub-part 51d and the lower guide sub-part 51c. In addition, the movable member 58 is interposed between the upper guide sub-part 51d and the lower guide sub-part 51c so that the horizontal (width direction) backlash is also prevented. Moreover, even if the movable member 58 and the guide part 51g are worn through sliding contact over long periods of use, the amount of wear would be substantially the same for the upper and lower sides of guide part 51g. That is, the amount of rotation of the movable member 58 with respect to the case 51 would increase, but the distance between the magnet 9 and the Hall IC 4 would hardly change, so that the output value of the linear operation type electric part is unlikely to fluctuate.

The spring assembly for restoring of the operation shaft 57 from its backward movement along the axial direction comprises the first spring members 61a i.e., a pair of identical coil springs having the same specification. The first spring members 61a abut with the pair of the prolonged arm parts 57c extending toward outer ends along the width direction of the movable member 58 perpendicularly to the axial direction G, such that the first spring members 61a are disposed at the outer ends of the movable member 58 along the width direction so as to impart equal opposing turning moments on the operation shaft 57. Thereby, the biasing forces against the backward movement of the operation shaft 57 maintain a good balance. In addition, because the spring assembly for restoring the movable member 58 from its backward movement further comprises a separate second spring member 61b, restoring force applied to the contact portion of the operation shaft 57 and the movable member 58 is dispersed, thus providing a more desirable operational touch.

To generate the turning moment M in the movable member 58, the second spring member 61b comprises a coil spring which is separately provided from the pair of coil spring members 61a for resisting the backward movement of the operation shaft 57. Therefore, it is possible to obtain a desirable and simple structure providing better mounting workability and low cost productivity.

With the above-described structure, when the turning moment M is generated in the movable member 58, the upper and lower portions of the front and back sliding parts 58e and 58ƒ of the movable member 58 slide under an elastic force while being interposed between the inclined planar surfaces of upper guide sub-parts 51d and the lower guide sub-parts 51c. Thus, the movable member 58 slides without vertical backlash. Consequently, a fixed vertical distance is maintained between the Hall IC 4 and the magnet 9, and the movable member 58 is held stably, and therefore, the output value of the Hall IC 4 does not vary even if vibration or the like occurs. Thus, it is possible to obtain an output value exhibiting excellent linearity as the magnet 9 moves.

As shown in FIGS. 1 to 5, the linear operation type electric part of the present invention includes the spring member 11, for restoring the movable member 8 from backward movement and another spring member 11 for preventing backlash in the movable member 8, both formed of the same type of coil springs. Therefore, it is possible to provide a linear operation type electric part which, when compared to conventional counterparts, requires fewer parts, and thus provides lower cost and increased productivity.

Moreover, in this embodiment of the present invention, the spring members 11 do not slide along the case 1 as in conventional counterparts, where a flat spring slides along the case. Therefore, it is possible to obtain a smooth movement of the movable member 8.

In the present invention, the movable member 8 receives from the spring members 11 the turning moment M for skewing the center line Z of the movable member 8, Z extending along a front-to-back direction from a center of the movable member in a width direction with respect to the axial direction G, thus rotating the movable member 8 within a plane extending along the width direction perpendicular to axial direction G. The rotation causes the front and back pairs of upper slide-contact parts 8d and 8d' and lower slide-contact parts 8c 8c' of the movable member 8 to press against and contact, respectively, the upper and lower guide sub-parts 1d and 1c of the case 1. The restriction mechanisms 10a and 10b restrict the movement of the movable member 8 along the vertical and width directions to prevent backlash of the movable member 8. The movable member 8 moves linearly while skewed in the width direction with respect to the axial direction G. Accordingly, the movable member 8 is prevented from having a backlash along the width direction. In addition, in a cross section taken perpendicularly to the axial direction G, the front and back pairs of lower slide-contact parts 8c and 8c' and upper slide-contact parts 8d and 8d' of movable member 8, abut, respectively, with , the lower and upper guide sub-parts 1c and 1d, so that backlash particularly along the vertical direction is prevented.

Because inclined planar surfaces can be provided as desired on the front and back pairs of either the lower or upper slide-contact parts 8c and 8c' or 8d and 8d' of movable member 8 and on either of the corresponding upper or lower guide sub-parts 1c and 1d of restriction mechanisms 10a and 10b of the case 1, flexibility is obtained.

Either the left and right pairs of the upper guide sub-parts 1d and the upper slide-contact parts 8d and 8d' or the pairs of left and right lower guide sub-parts 1c and the lower slide-contact parts 8c and 8c' are formed so that the inclined planar surfaces are capable of abutting with each other while the other pairs comprise restriction means having an arc-shaped surface and a flat surface abutting with the arc-shaped surface. Consequently, the arc-shaped surface and the flat surface abut linearly with each other so that it is possible to obtain smooth movement thereof and to enhance the positioning accuracy of the movable member 8 along the vertical direction.

Inclined planar surfaces can be provided on either the movable member 8 on surfaces 8d and 8d' or on the case 1 on surfaces 1d or on both thereof, thus enabling more flexibility.

The restriction means are composed of the first and second restriction mechanisms 10a and 10b provided on the left and right sides along the width direction perpendicular to the axial direction G of the operation shaft 7, thereby guiding the movable member 8 at two positions (on the left and right sides). Consequently, it is possible to prevent the movable member 8 from having the vertical and horizontal (width direction) backlash even more securely.

One of each of the first and second restriction mechanisms 10a and 10b is positioned near the operation shaft 7 while the other of each of the first and second restriction mechanisms 10a and 10b is positioned farther from the operation shaft. Thus, the movable member 8 is guided along the front-to-back direction with respect to the axial direction G, while securely held.

The turning moment M of the movable member 8 is generated by the pair of spring members 11 each fabricated from only one type of identical coil spring. Therefore, a fewer number of parts are required for the production of a linear operation type electric part of the present invention, thus providing lower cost and increased production efficiency.

The turning moment M of the movable member 8 is generated by the spring members 11 comprising two coil springs offset to the left and right sides along the width direction from the central axis G of the operation shaft 7. Therefore, it is possible to provide a simple structure for generating the turning moment M in the movable member 8.

Moreover, since the rotary force applied to the movable member 8 is related to the difference between the total spring deflections of each coil spring, it is possible to make the rotary force smaller than the forward biasing force, thus providing smooth movement of the movable member 8.

The force applied to the movable member 8 by each of the two coil springs is controlled by differentiating the respective distances between the position at which each coil spring abuts with the movable member 8 and a position at which each of the coil spring abuts with the case 1. Consequently, identical coil springs each having the same spring constant may be employed, thus obtaining desirable production efficiency.

The two coil springs are disposed at positions on a line W extending perpendicularly to the axial direction G of the operation shaft 7. Thus, a good force balance is maintained when pressing the operation shaft 7, and thus realizing a smooth movement of the movable member 8.

The movable member 8 is in elastic contact with the operation shaft 7 due to the action of the spring members 11. Therefore, it is possible to provide a linear operation type electric part without backlash between the operation shaft 7 and the movable member 8, thus obtaining accurate movement of the movable member 8.

The restriction mechanisms 10a and 10b may be formed with inclined planar surfaces on left and right upper guide sub-parts 1d and with opposing inclined planar surfaces on the corresponding upper sliding parts 8d and 8d'; and with flat surfaces on the left and right lower guide sub-parts 1c and with opposing flat surfaces on the corresponding lower sliding parts 8c and 8c'. Alternatively, the flat surfaces on the pair of lower guide sub-parts 1c or the pairs of lower sliding parts 8c and 8c' may comprise convex portions in contact with flat surfaces on their corresponding contact surfaces. Therefore, if a turning moment is generated in the movable member 8 in a direction pitching the movable member 8, it moves until the flat surfaces on the lower guide sub-parts 1c and the corresponding lower sliding parts 8c and 8c' or the flat surfaces and the corresponding pair of the convex portions abut with each other. Thus, it is possible to substantially maintain the vertical position of the movable member 8 relative to the Hall IC 4, thereby providing a linear operation type electric part of the present invention having desirable linear output characteristics.

Moreover, the restriction mechanisms 10a and 10b may be formed with inclined planar surfaces on the left and right lower guide sub-parts 1c and with opposing inclined planar surfaces on the corresponding lower sliding parts 8c and 8c'; and with flat surfaces on the left and right of upper guide sub-parts 1d and with opposing flat surfaces on the corresponding upper sliding parts 8d and 8d'. Alternatively, the flat surfaces on the pair of upper guide sub-parts 1d or the pairs of upper sliding parts 8d and 8d' may comprise convex portions in contact with flat surfaces on the corresponding contact surfaces. Therefore, if a turning moment is generated in the movable member 8 in a direction pitching the movable member, it moves until the flat surfaces on the upper guide sub-parts 1d and the corresponding upper sliding parts 8d and 8d' or the flat surfaces and the pair of convex portions abut with each other. Thus, similarly, it is possible to maintain the vertical position of the movable member 8 relative to the Hall IC 4, thereby providing a linear operation type electric part of the present invention having desirable output characteristics.

Furthermore, as shown in FIGS. 6 to 10, in another embodiment of the present invention the restriction mechanisms include opposing inclined planar surfaces provided on the upper guide sub-parts 51d and on the upper slide-contact parts 58d, and opposing inclined planar surfaces on the lower guide sub-parts 51c and the lower slide-contact parts 58c, so that each pair of inclined planar surfaces are kept in elastic contact by the turning moment applied by the spring member. Consequently, the upper guide sub-parts 51d having an inclined planar surface and the upper slide-contact parts 58d, and the lower guide sub-parts 51c and the lower slide-contact parts 58c respectively abut with each other while pressed along corresponding inclined planar surfaces. Therefore, the movable member 58 is prevented from having a vertical backlash by the upper guide sub-parts 51d and the lower guide sub-parts 51c. In addition, the movable member 58 is interposed between the upper guide sub-parts 51d and the lower guide sub-parts 51c so that a horizontal (width direction) backlash is also prevented.

In this embodiment, the spring assembly comprises the pair of first spring members 61a for biasing the operation shaft 57 so as to be restored from forward movement thereof, and the second spring member 61b for biasing the movable member 58 so to restored it from forward movement thereof, in which the second spring member 61b is formed of one coil spring for pushing the movable member 58 in a restoring backward direction at a position offset from the central axis. To generate the turning moment M in the movable member 58, the second spring member 61b, comprising a coil spring, is separately provided apart from the pair of spring members 61a, comprising coil springs, for restoring the movement of the operation shaft 57. Therefore, it is possible to obtain a desirable and simple structure providing better mounting workability and low cost productivity.

The prolonged arm parts 57c, each extending toward outer ends of the movable member 58 along the width direction and perpendicular to the axial direction G, are provided on the operation shaft 57 at an end contacting the movable member 58, each prolonged arm part 57c in contact with its corresponding first spring members 61a, such that the pair of the first spring members 61a are provided at the outer ends along the width direction of the movable member 58 so as to maintain balanced, opposing, turning moments on the operation shaft 57 when it is pressed in a backward direction. In addition, because the spring assembly for restoring the movable member 58 from its forward movement includes a separate second spring member 61b, restoring force applied to the contact portion of the operation shaft 57 and the movable member 58 is dispersed, thus obtaining a more desirable operational touch.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A linear operation type electric part comprising:
   an operation shaft having an end and linearly movable along an axial direction;
   a movable member having and abutting with the end of the operation shaft, the movable member being disposed so as to be linearly movable by the operation shaft;
   a spring assembly for biasing the movable member so as to be restored from backward movement thereof;
   a case having a guide part for guiding the movable member during the movement thereof; and
   detection means connected to the movable member and operated by the linear movement of the movable member, wherein
   the guide part of the case comprises an upper guide sub-part and a lower guide sub-part for guiding, respectively, the movable member from above and from below;
   the movable member comprises a lower slide-contact in sliding contact with the lower guide sub-part, and an upper slide-contact part, located above and opposing to the lower slide-contact part, in sliding contact with the upper guide sub-part;
   the upper and lower guide sub-parts and the upper and lower slide-contact parts form a restriction mechanism for restricting the movement of the movable member;
   the movable member receives from the spring assembly a turning moment for skewing a center line of the movable member in a direction different than the axial direction, thus rotating the movable member around an axis different than the axial direction;
   the rotation causes the upper and lower slide-contact parts of the movable member to be pressed against and in contact with the upper and lower guide sub-parts of the case, respectively;
   the restriction mechanism restricts the movement of the movable member along a vertical and width directions preventing a backlash of the movable member;
   the movable member moves linearly while being skewed with respect to the axial direction; and
   either the upper or lower guide sub-parts and their corresponding upper and lower slide-contact parts of the restriction mechanism are formed of inclined planar surfaces capable of abutting with each other while the other of the upper or lower guide sub-parts and their corresponding slide-contact parts are formed of an arc-shaped surface and a flat surface abutting with the arc-shaped surface.

2. The linear operation type electric part according to claim 1, wherein the restriction mechanism comprises a first and a second restriction mechanism provided on left and right sides along the width direction perpendicular to the axial direction of the operation shaft.

3. The linear operation type electric part according to claim 2, wherein one of the first and second restriction mechanisms is positioned near the operation shaft while the other of the first and second restriction mechanisms is positioned farther from the operation shaft than the one of the first and second restriction mechanisms.

4. The linear operation type electric part according to claim 1, wherein the turning moment of the movable member is generated by the spring assembly comprising one coil spring member.

5. A linear operation type electric part comprising:
   an operation shaft having an end and linearly movable along an axial direction;
   a movable member having and abutting with the end of the operation shaft, the movable member being disposed so as to be linearly movable by the operation shaft;
   a spring assembly for biasing the movable member so as to be restored from backward movement thereof;
   a case having a guide part for guiding the movable member during the movement thereof; and
   detection means connected to the movable member and operated by the linear movement of the movable member, wherein
   the guide part of the case comprises an upper guide sub-part and a lower guide sub-part for guiding, respectively, the movable member from above and from below;
   the movable member comprises: a lower slide-contact in sliding contact with the lower guide sub-part, and an upper slide-contact part, located above and opposing to the lower slide-contact part, in sliding contact with the upper guide sub-part;
   the upper and lower guide sub-parts and the upper and lower slide-contact parts form a restriction mechanism for restricting the movement of the movable member;
   the movable member receives from the spring assembly a turning moment for skewing a center line of the movable member in a direction different than the axial direction, thus rotating the movable member around an axis different than the axial direction;
   the rotation causes the upper and lower slide-contact parts of the movable member to be pressed against and in contact with the upper and lower guide sub-parts of the case, respectively;
   the restriction mechanism restricts the movement of the movable member along a vertical and width directions preventing a backlash of the movable member;
   the movable member moves linearly while being skewed with respect to the axial direction; and
   the turning moment of the movable member is generated by the spring assembly comprising two coil springs members disposed on left and right sides along the width direction perpendicular to the axial direction of the operation shaft.

6. The linear operation type electric part according to claim 5, wherein a force applied to the movable member by each of the two coil springs members is controlled by differentiating a distance between a position at which each coil spring member abuts with the movable member and a position at which each coil spring member abuts with the case.

7. The linear operation type electric part according to claim 5, wherein the two coil spring members are disposed at positions on a line extending perpendicularly to the axial direction of the operation shaft.

8. A linear operation type electric part comprising:

an operation shaft having an end and linearly movable along an axial direction;

a movable member having and abutting with the end of the operation shaft, the movable member being disposed so as to be linearly movable by the operation shaft;

a spring assembly for biasing the movable member so as to be restored from backward movement thereof;

a case having a guide part for guiding the movable member during the movement thereof; and detection means connected to the movable member and operated by the linear movement of the movable member, wherein the guide part of the case comprises an upper guide sub-part and a lower guide sub-part for guiding, respectively, the movable member from above and from below;

the movable member comprises: a lower slide-contact in sliding contact with the lower guide sub-part, and an upper slide-contact part, located above and opposing to the lower slide-contact part, in sliding contact with the upper guide sub-part;

the upper and lower guide sub-parts and the upper and lower slide-contact parts form a restriction mechanism for restricting the movement of the movable member;

the movable member receives from the spring assembly a turning moment for skewing a center line of the movable member in a direction different than the axial direction, thus rotating the movable member around an axis different than the axial direction;

the rotation causes the upper and lower slide-contact parts of the movable member to be pressed against and in contact with the upper and lower guide sub-parts of the case, respectively;

the restriction mechanism restricts the movement of the movable member along a vertical and width directions preventing a backlash of the movable member;

the movable member moves linearly while being skewed with respect to the axial direction;

the restriction mechanisms comprise opposing inclined planar surfaces provided on the upper guide sub-parts and on the corresponding upper slide-contact parts, and opposing inclined planar surfaces on the lower guide sub-parts and the lower slide-contact parts, so that each pair of inclined planar surfaces are kept in elastic contact by the turning moment applied by the spring assembly; and the spring assembly comprises a first spring member and a second spring member for biasing the operation shaft so as to be restored from backward movement thereof, and wherein the second spring member is formed of one coil spring for pushing the movable member in a forward restoring direction at a position offset from the central axis.

9. The linear operation type electric part according to claim 8, wherein prolonged arm parts, each extending toward outer ends along the width direction of the movable member and perpendicular to the axial direction, are provided on the operation shaft at an end contacting the movable member, each prolonged arm part being in contact with the first spring member, such that a pair of the first springs are provided at the outer ends along the width direction of the movable member so as to provide balanced, opposing, turning moments on the operation shaft.

* * * * *